United States Patent [19]
Vetter

[11] Patent Number: 5,716,211
[45] Date of Patent: Feb. 10, 1998

[54] EDUCATIONAL SAVINGS APPARATUS AND METHOD

[76] Inventor: Lance Vetter, 10915 La Salinas Cir., Boca Raton, Fla. 33428

[21] Appl. No.: 831,041

[22] Filed: Apr. 1, 1997

[51] Int. Cl.$^6$ ............................................. G09B 19/18
[52] U.S. Cl. ............................................. 434/107; 446/8
[58] Field of Search ............................ 434/107, 236, 434/238; 446/8, 9, 10, 11, 12; 109/53, 56

[56] References Cited

U.S. PATENT DOCUMENTS

| | | | |
|---|---|---|---|
| D. 160,133 | 9/1950 | Thompson | 446/8 |
| 2,230,699 | 2/1941 | Schulze | 434/107 |
| 2,297,011 | 9/1942 | Mooney | 434/107 |
| 2,883,765 | 4/1959 | Blaine | 434/238 |
| 3,035,355 | 5/1962 | Holmes | 434/238 |
| 3,992,805 | 11/1976 | Arkin | 446/8 |
| 5,429,373 | 7/1995 | Chelko et al. | 434/236 |
| 5,470,235 | 11/1995 | Papaleo | 434/238 |
| 5,482,487 | 1/1996 | Harris | 434/107 |
| 5,577,915 | 11/1996 | Feldman | 434/238 |

Primary Examiner—Paul J. Hirsch
Attorney, Agent, or Firm—Malin, Haley, DiMaggio & Crosby

[57] ABSTRACT

An educational savings bank and toy is provided that includes a plurality of separate monetary input and storage locations that correspond to different budgetary categories, that automatically calculates an appropriate distribution of funds for each budgetary category based on a preselected percentage of money available to invest, and that automatically calculates the future value of funds in each budgetary category based on a user's age and a preselected time-frame and interest rate appropriate for that budgetary category. Written investment instructions are provided to advise the user on appropriate actual investments for the money totals saved in each category based on the budgetary goal of that category. One embodiment includes a base member with a plurality of representative figures selected to represent each discrete budgetary category and includes a microprocessor that calculates and displays the amounts of an investment total to be allocated to each budgetary account, and their future values.

21 Claims, 3 Drawing Sheets

EDUCATIONAL SAVINGS APPARATUS AND METHOD

BACKGROUND OF THE INVENTION

1. Field of the Invention

The present invention relates to educational monetary devices and more particularly to educational savings banks and toys that include a plurality of separate monetary input and storage locations that correspond to different budgetary categories, that automatically calculates an appropriate distribution of funds for each budgetary category for an amount of money available to invest, and that automatically calculates the future value of funds in each budgetary category. Written investment instructions are provided to advise the user on appropriate actual investments for the money totals saved in each category.

2. Description of Related Art

Various U.S. Patents are directed at teaching children and adults about saving money and/or about budgeting or handling money. For example, U.S. Pat. No. 3,992,805 to Arkin discloses a toy bank having a hollow base portion in the shape of a bird's nest, three separate storage drawers for holding coins for different budgetary purposes. The device has three bird figures on top of the hollow base portion, each bird figure having a separate slot to receive coins, each slot directing the coins to one of the separate storage drawers. Each bird figure is labeled with a budgetary purpose for saving.

U.S. Pat. No. 5,482,487 to Harris discloses a motivational savings bank having a plurality of separate chambers of sequential ascending vertical heights and a plurality of indicia on each chamber indicating ascending levels of achievement corresponding to the various heights. Each chamber, except the shortest, having a slot to receive tokens of various denominations. As a reward for various achievements, a parent will reward a child with one or more of the tokens that are placed into one of the slots. At agreed upon time periods, the chambers can be emptied and the tokens exchanged for real currency.

U.S. Pat. No. 5,092,776 to Shanahan discloses a child's educational monetary game of unitary structure having three discrete dwelling-like containers of ascending size. Each dwelling structure is marked with a relative monetary denominations, and includes a receptacle containing a plurality of plate members. Each dwelling container, receptacle, and associated plate members are colored or patterned alike. The different color combinations associated with the sizes of the dwelling containers and marked relative monetary denominations is intended to teach children about different monetary values.

U.S. Pat. No. 4,959,017 to Thompson et al. discloses an electronic device for teaching how to handle money.

U.S. Pat. No. 3,313,477 to Brown discloses a transparent bank having a number of discrete chambers for receiving coins of differing sizes. The housing includes two inclined guideways such that a coin inserted into the housing rolls down the first guideway into the second guideway. The second guideway includes a series of different sized apertures, each size corresponding to a different denomination coin. As the coin passes down the second guide way, it falls into the appropriately sized aperture and into one of the chambers.

U.S. Pat. No. 2,297,011 to Mooney teaches a system for illustrating economic principles.

U.S. Pat. No. 2,230,699 to Schulze discloses a game board to teach budgeting income. The game board has a plurality of slots which the user can label with various budget items such as food, shelter, etc. The user has a set number of denominational tokens, which ideally will represent his/her income, and uses the tokens to calculate a budget by inserting them into the various labeled slots.

U.S. Pat. No. 1,967,230 to Eble et al. teaches an instrument for visualizing the status of a monetary budget.

However, none of the references discussed above, nor any disclosure to date, teaches a savings apparatus that includes the features of the present invention. Namely, there has not heretofore been disclosed an apparatus that automatically calculates the percentage of a given investment amount to be allocated to each of the various budgetary accounts. Nor has there been disclosed an apparatus that calculates the future value of the amount in each individual account based on the age of the user and an appropriate time-frame preselected for each budgetary account's purpose, and which is automatically calculated using separate and discrete interest rates preset for each individual budgetary account. Nor has there been disclosed an apparatus that includes an investment guide that advises the user on where to actually invest the various saved amounts in each individual account based on the intended budgetary goal of that account.

Therefore, it is to the effective resolution of the above-identified problems that the present invention is directed.

SUMMARY OF THE INVENTION

The present invention is an educational savings apparatus and method that, in one embodiment, includes a savings bank that has a base member with a plurality of individual hollow compartments. Each compartment includes an appropriate representative figure that corresponds to a preselected budgetary account. Each figure includes an aperture for receiving investment money and directing inserted money to the particular compartment for saving in the corresponding budgetary account.

The invention can include an input keypad, at least one display, and an microprocessor for calculating various amounts as described below.

The invention automatically calculates one or more preselected percentage(s) of a given investment amount for allocation to the various budgetary accounts. Thus the invention calculates, based on preselected percentages, specific amounts to be allocated to each of the various budgetary accounts. The future value of the amount deposited in each individual account can be automatically calculated, based on the age of the user and an appropriate time-frame preselected for the purpose of each budgetary account, and can be calculated using separate and discrete interest rates preset for each individual budgetary account.

One of the budgetary accounts in the apparatus can be selected as discretionary funds, or spending money. If the funds designated as spending money are added to the various other budgetary savings accounts, or if the user just wants to see the effect of saving a given amount, the apparatus can quickly display the future value of funds to be placed in the various budgetary savings accounts. As stated above, the future value of the amount to be deposited in each individual account is calculated, based on the age of the user and an appropriate time-frame and interest rate preselected for each discrete budgetary account.

In this manner, a user can quickly and directly see the effects of saving additional funds in the various accounts, as opposed to spending those funds.

The invention includes an investment guide that, in one embodiment, can be a written guide carried in a pocket or other conventional holder, in a suitable location such as on the backside of the apparatus, and that can advise the user on where to actually invest the various amounts saved in each individual account based on the intended budgetary goal of that account.

Accordingly, it is an objective of the present invention to provide an educational savings bank that automatically calculates the portion of an investment amount for each of a plurality of budgetary saving accounts based on a preset percentage.

It is another objective of the present invention to provide an educational savings bank that calculates and displays the future value of amounts in each individual budgetary account based on the user's age, and a pre-selected timeframe and interest rate associated with each of the individual savings account.

It is further objective of the present invention to provide an educational savings bank that provides an investment guide to direct the user on where to actually invest the amounts saved in each budgetary account based on the purpose of that particular budgetary account's goal.

In accordance with these and other objects which will become apparent hereinafter, the instant invention will now be described with particular reference to the accompanying drawings.

DESCRIPTION OF THE PREFERRED EMBODIMENTS

Figure 1:
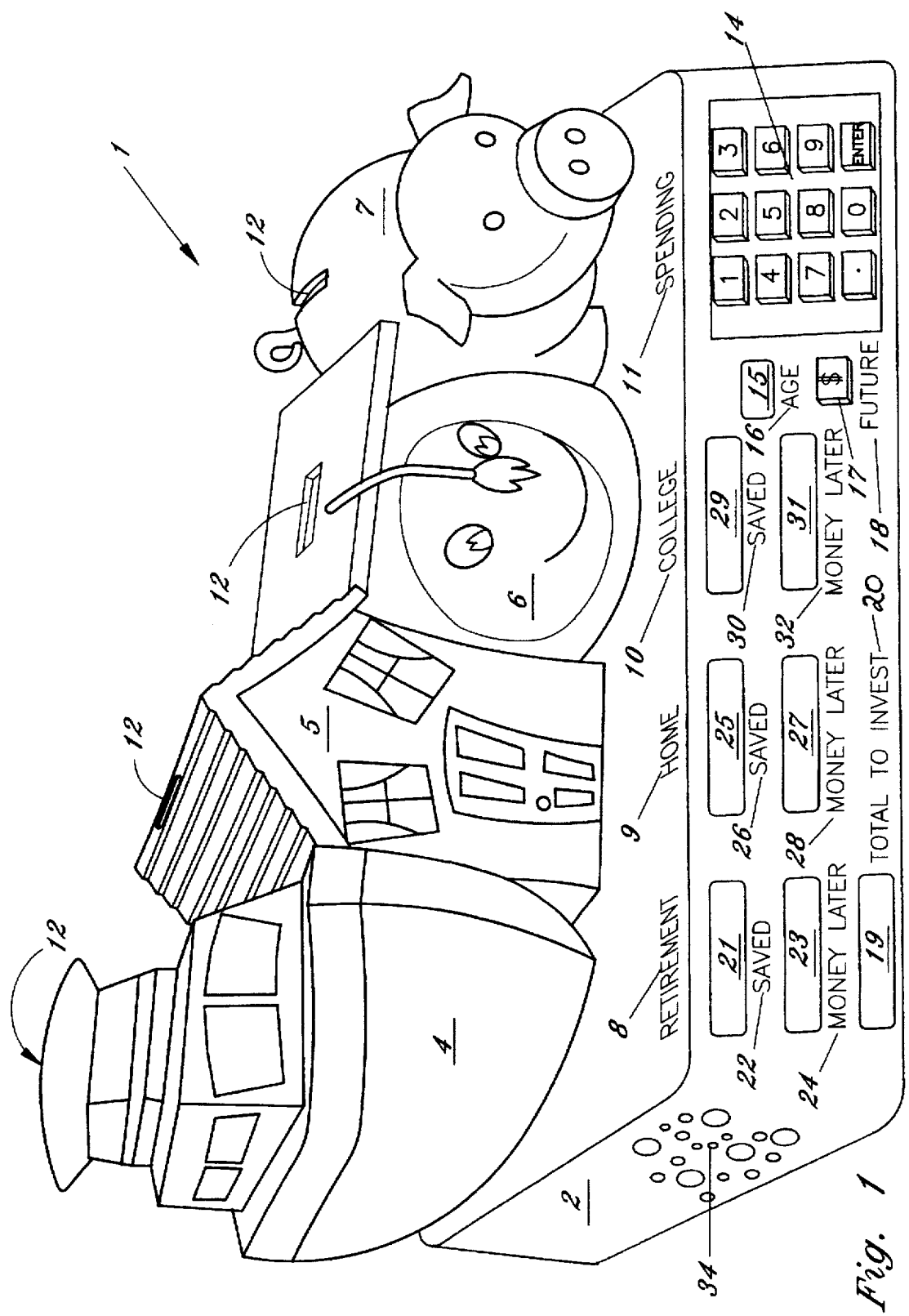
FIG. 1 is a front perspective view of one embodiment of the present invention.

Referring to FIG. 1 , the preferred embodiment of the present invention, shown generally as 1, includes base member 2, and four representative figures consisting of a boat 4, a house 5, a graduate 6, and a piggy bank 7. The invention 1 can be made of any suitable material and is preferably a molded plastic or equivalent material. Representative FIGS. 4 through 7 have separate and discrete internal hollow compartments and correspond to the indicia: "RETIREMENT" 8, "HOME" 9, "COLLEGE" 10, and "SPENDING" 11 which are the budgetary savings accounts selected in this embodiment of the invention. Representative FIGS. 4–7 each include a slot 12 for insertion of investment money for saving in each budgetary savings account.

Base 2 includes keypad 14, display 15 labeled with indicia "AGE" 16, button 17 labeled with indicia "$" and "FUTURE", and display 19 labeled with indicia "TOTAL TO INVEST" 20. Adjacent and corresponding to "RETIREMENT" 8 is display 21 labeled with indicia "SAVED" 22 and display 23 labeled with indicia "MONEY LATER" 24. Adjacent and corresponding to "HOME" 9 is display 25 labeled with indicia "SAVED" 26 and display 27 labeled with indicia "MONEY LATER" 28. Adjacent and corresponding to "COLLEGE" 10 is display 29 labeled with indicia "SAVED" 30 and display 31 labeled with indica "MONEY LATER" 32. Base 2 can also include a speaker 34 for the user to receive audible signals and/or prompts.

The plurality of displays and indicia described herein as the preferred embodiment is for example only, and not by way of limitation, and can be replaced with other equivalent displays such as by utilizing a larger dot matrix display to incorporate some or all of the above displays. The individual displays where selected in the preferred embodiment because of the desirable physical layout shown in FIG. 1.

Figure 2:
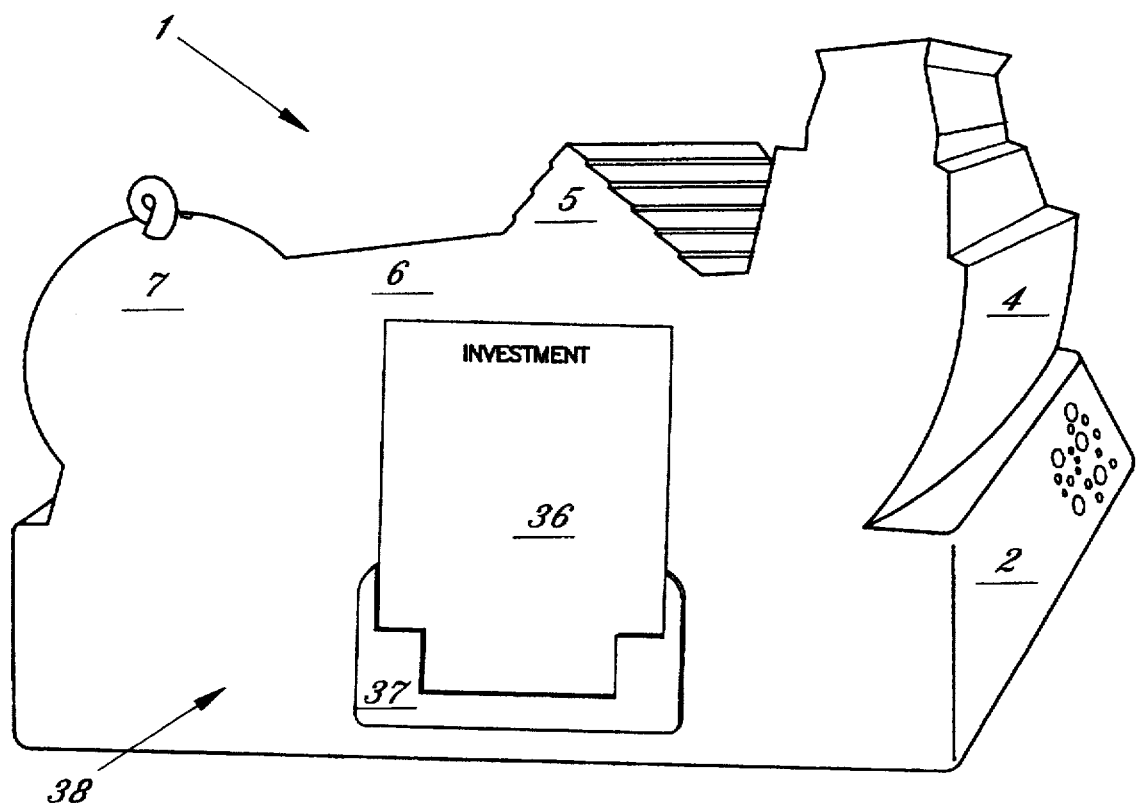
FIG. 2 is rear perspective view of the embodiment of figure 1.

Referring to FIG. 2, investment guide booklet 36 can be held in place by pocket 37, or other connected holder, preferably connected to a suitable location such as on the back 38 of base 2. Investment guide booklet 36 provides investment advice to the user for actual investments of the funds saved in each budgetary account according to the investment goal of the particular account. In other words, the investment advice for funds in the retirement account would correspond to proper investments for retirement, investments for the home account and college account would correspond to investments appropriate for those accounts. The investment booklet can be customized by professionals and those knowledgeable in the financial planning arts, and can be updated periodically to maintain currency. Additionally, the information in booklet 36 can be written to correspond to the level of comprehension of the anticipated user.

Figure 3:
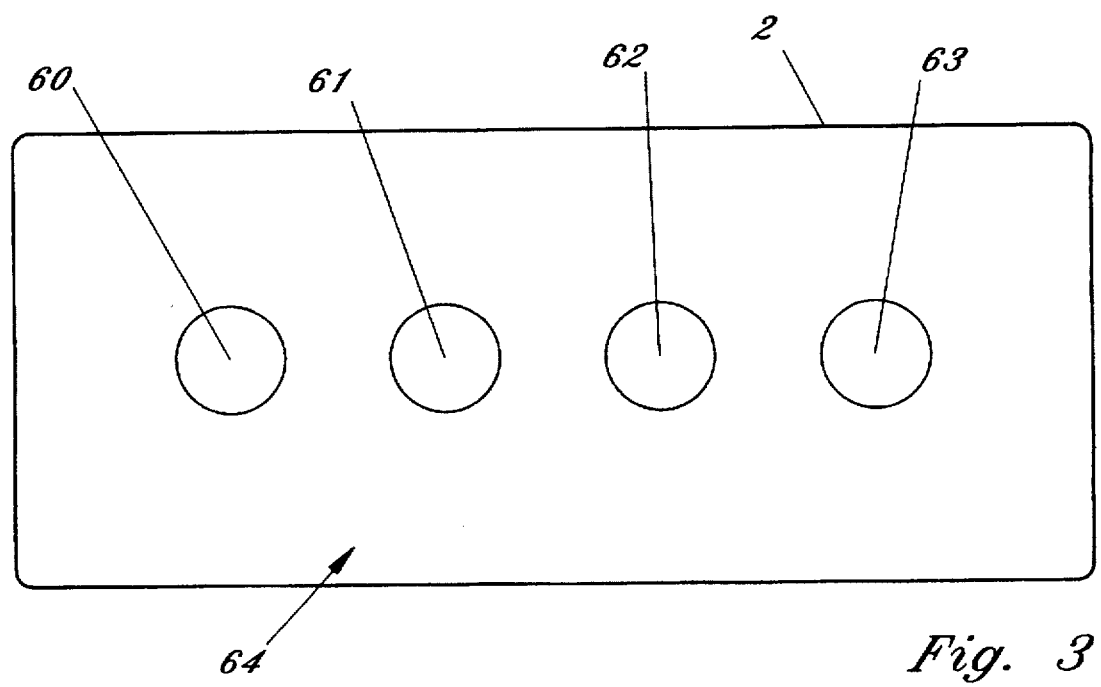
FIG. 3 is bottom plan view of the embodiment of FIG. 1.

Referring to FIG. 3, money placed within each of the separate compartments can be retrieved by removing each of the corresponding plugs 60, 61, 62, and 63 on the bottom 64 of base 2. Plugs 60–63 can be made of a hard or resilient plastic or rubber-like material, and each plug provides access to the internal hollow compartments associated with each representative FIGS. 4–7.

Figure 4:
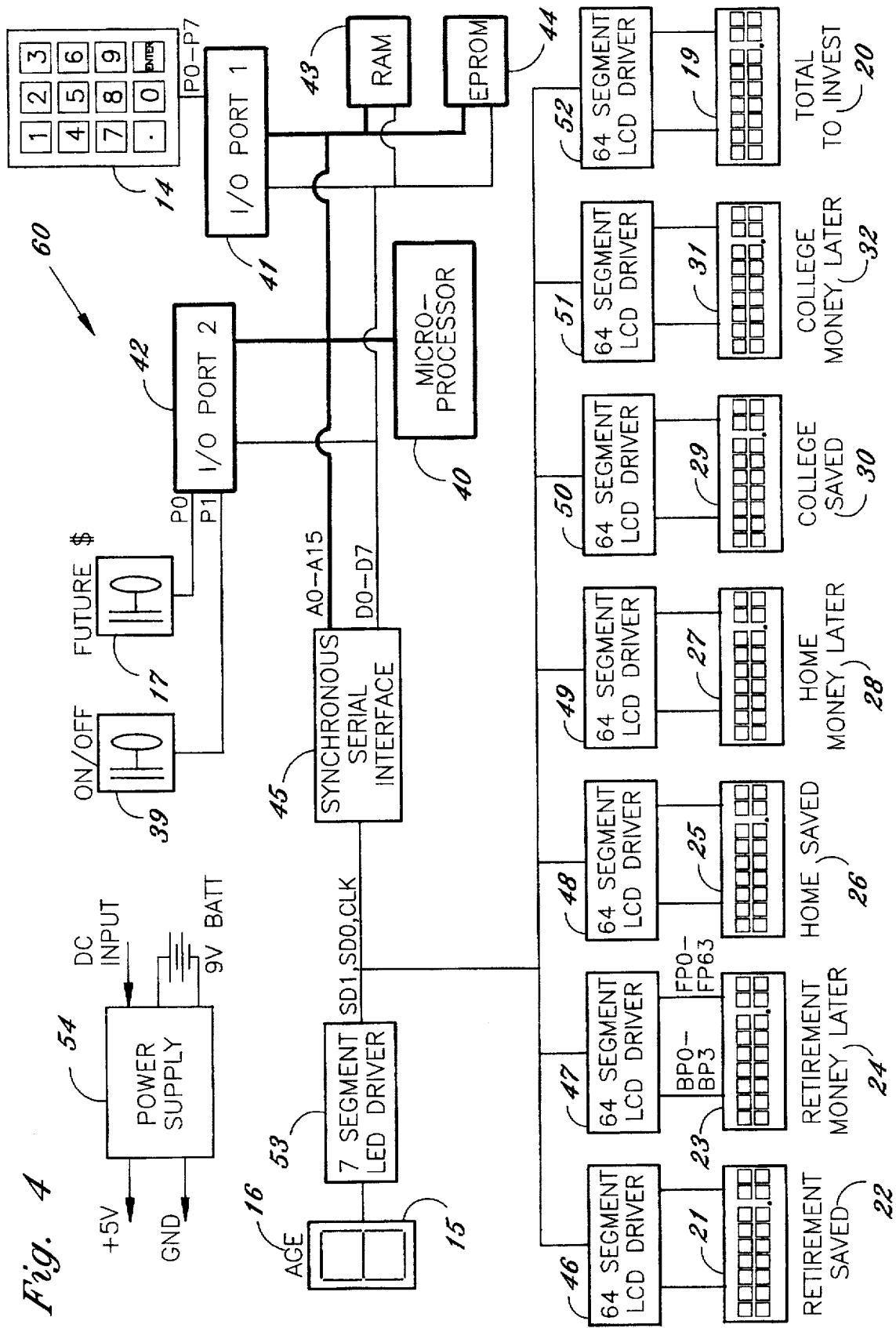
FIG. 4 is functional block diagram of one embodiment of the electronic control of the present invention.

Referring now to FIG. 4, one embodiment for performing calculations and controlling the displays of the present invention, which is preferably housed in base 2, is shown generally as 60. Microprocessor 40 controls the operation of circuit 60. Circuit 60 includes I/O port one 41 and I/O port two 42 which receive inputs from the peripheral switches 17, 39, and keypad 14. Circuit 60 also includes random access memory (RAM) 43 which stores data, and erasable programmable read only memory (EPROM) 44 which stores the computer software program. The synchronous serial interface 45 sends data to the displays. The components of circuit 60 as described above are shown as separate functional items in FIG. 4. However, as known in the art, a single microcontroller chip could contain all of these functional items, or separate components could be utilized and interconnected as shown in FIG. 4.

The synchronous serial interface 45 communicates data from microprocessor 40 to each sixty four (64) segment driver 46–52 that correspond to displays 21, 23, 25, 27, 29, 31, and 19, respectively, which display what is indicated on indicia 22, 24, 26, 28, 30, 32, and 20, respectively. Synchronous serial interface 45 also communicates with seven (7) segment driver 53 to display age indicia 16 on display 15. Displays 21, 23, 25, 27, 29, 31, 19 and 15 can be liquid crystal displays (LCD) or equivalents such as LED or other displays. The number of digits of each display can be preselected to be any suitable number. The decimal place can be preselected to provide accuracies to the cents, tens, or dollars. If the number of digits changes in the displays, then the number of segments will also change accordingly, as is known in the art. For example, if display 15 is selected as a fourteen (14) segment display, then segment driver 53 will be selected as a fourteen (14) segment driver. Likewise the sixty four (64) segment displays can be changed to nearly any number of segments, and the corresponding sixty four (64) segment drivers will be changed accordingly.

A power supply 54 can supply +5V DC power to operate the circuit of FIG. 4 from either an external DC power input source or an internal battery, such as a +9V battery. The external DC power source can be from any known AC to DC converter which can be housed within base 2, or can be located remote from base 2 such as at an AC wall outlet receptacle.

The operation of one embodiment of the present invention 1 will be described referring to the software structure program as follows:

---
SOFTWARE STRUCTURE PROGRAM
---

```
If ON/OFF switch pressed then
    If system is ON then
        Turn_System_Off
    else
        Turn_System_On
        Reset On timer to 2 min
    end if
end if
If On timer expired then
    Turn-System-Off
end if
If key pressed then
    Reset On timer to 2 min
end if
If (Age=get_age) = OK then
    If (X=get_amount(invest)) = OK then
        X=X/10   // select 10% of total amount for each goal
        display_house(X, SAVED)
        display_college(X, SAVED)
        display_retirement(X, SAVED)
        Y=0      // Assume 0 additional savings
                 // optional if
        If (Y=add_spend_amount_to savings) = OK then
            display_house(X+Y, SAVED)
            display_college(X+Y, SAVED)
            display_retirement(X+Y, SAVED)
        end if   // end of optional code
        money_later= calculate_interest (X+Y, 10%, 65-Age)
        display_retirement(money_later, LATER)
        money_later= calculate_interest (X+Y, 8%, 30-Age)
        display_house(money_later, LATER)
        money_later= calculate_interest (X+Y, 7%, 18-Age)
        display_college(money_later, LATER)
    end if
end if
Last pressed = 0
If (FUTURE $ = pressed) & (last pressed = 0) then
    If (Age=get_age) = OK then
        If (X= get_amount(retirement)) = OK then
            Last pressed =1
            money_later= calculate_interest (X, 10%, 65-Age)
            display_retirement(money_later, LATER)
        end if
        If (FUTURE $ = pressed) & (last pressed = 1) then
            Last pressed =2
            money_later= calculate_interest (X, 8%, 30-Age)
            display_house(money_later, LATER)
        end if
        If (FUTURE $ = pressed) & (last pressed = 2) then
            Last pressed =0
            money_later= calculate_interest (X, 7%, 18-Age)
            display_college(money_later, LATER)
        end if
    end if
end if
```

Referring also to FIG. 4, the software structure program listed above can reside in EPROM 44 to be run on microprocessor 40.

On/off switch 39 activates microprocessor 40 and the rest of the components of circuit 60. Switch 39, shown in FIG. 4 as a separate and independent switch, can be located in any suitable position on base 2 (not shown). Alternately, the other input switch 17 and keypad 14 can perform the same function as on/off switch 39 such that when a user depresses switch 17 or any key on keypad 14, circuit 60 is activated.

If microprocessor 40 is active when switch 39 is depressed, then microprocessor 40 will deactivate circuit 60 and go into a sleep mode until activated by input through I/O ports 41 or 42.

Once microprocessor 40 is active, a timer begins counting for a preselected time period of 2 minutes for the preferred embodiment. If no additional keys are depressed for the 2 minute time period, microprocessor 40 will deactivate circuit 60 and go into a sleep mode, awaking again when activated by a switch being depressed as described above. This feature extends the life of a battery which may be used as the power source as described herein above.

Once active, microprocessor 40 will request or prompt the user to enter his or her age. The prompt to input age, and other prompts as described below, can be accomplished in any suitable manner such as a written message on an alphanumeric display (not shown), an audible message could be generated, or as the case in this embodiment, age display 15, or other appropriate display, will blink. The user's age is entered via keypad 14, and is then sent by microprocessor 40 to synchronous serial interface 45 and to seven (7) segment LED driver 53 to be displayed on display 15.

Next, the user will be prompted to enter the total to invest, again in a suitable manner which, in the embodiment being described, will be display 19 blinking. The total to invest is entered via keypad 14, and is then sent by microprocessor 40 to synchronous serial interface 45 and to sixty four (64) segment LCD driver 52 to be displayed on display 19.

Once the total to invest is entered, microprocessor 40 will calculate the totals to be saved in each of the plurality of accounts which, in this embodiment, are the retirement, home, and college accounts. The calculation is based on preselected percentages of the total to invest, which in this embodiment is preferably selected to be 10 percent (10%) for each account. Each 10% amount is then sent by microprocessor 40 to synchronous serial interface 45 and to 64 segment LCD drivers 46, 48, and 50 to be displayed on displays 21, 25, and 29, which are the retirement saved 22, home saved 26, and college saved 30 accounts respectively.

The future value of the amounts saved in each of the accounts 22, 26, and 30 are calculated according to conventional future value calculations based on the user's age, a preselected time-frame, and a preselected interest rate. In the case of the preferred embodiment, the future value of the retirement account is calculated using a 10% interest rate for a term of 65 years minus the user's age. The future value of the house or home account is calculated using an 8% interest rate for a term of 30 years minus the user's age. The future value of the college account is calculated using a 7% interest rate for a term of 18 years minus the user's age.

The future values are calculated by microprocessor 40 and sent to serial interface 45 and to 64 segment drivers 47, 49, and 51 to be displayed on displays 23, 27, and 31 which correspond to the retirement money later 24, home money later 28, and college money later 32 accounts.

In brief summary, the user enters age and the total to invest. The amount to save and the future value of that amount is calculated and automatically displayed, as described in detail above.

The balance of the total to invest can be placed into a fourth account for spending money. Alternately, the user may want to save the balance rather that putting it into the spending account. To assist the user in determining which account to place the balance of the funds that he or she wants to save, the future value of a selected amount can be calculated and displayed.

The user presses the future value switch 17 and is prompted to enter age by the blinking of age 16 display 15. If the user has already entered his or her age as described above, the microprocessor can use the previously entered age. As described below, the user will next be prompted to enter the total to invest in each account in turn and the future value of the amount will be calculated for each account.

The user is prompted to enter the total to invest in the retirement account by the blinking of display 21, the retirement saved 22 account, and optionally the blinking of display 23, the retirement money later 24 account. The total to invest is entered via keypad 14 and displayed on display 21, and the future value for retirement money later 24 account is calculated and displayed on display 23 as described herein above. The same calculation as described above based on 10% interest and a term of 65 years minus the user's age is again used. As above, the result of the calculation is sent by microprocessor 40 to serial interface 45 and to LCD driver 47 to be displayed on display 23, the retirement money later 24 account.

The user can then press the future value switch 17 again and be prompted to enter the total to invest by the blinking of display 25, the home saved 26 account, and optionally display 27, the home money later 28 account. As above for the retirement account, the total to invest is entered via keypad 14 and displayed on display 25, and the future value for home money later 28 account is calculated and displayed on display 27, using the same calculation for the home money later 28 account as described herein above.

The user can press the future value switch 17 again and be prompted to enter the total to invest by the blinking of display 29, the college saved 30 account, and optionally display 31, the college money later 32 account. As above for the retirement and home accounts, the total to invest is entered via keypad 14 and displayed on display 29, and the future value for college money later 32 account is calculated and displayed on display 31 using the same calculation for college money later 32 as described herein above.

If the user wants to check the future value of a amount in only one of the three accounts, the user can press the future value switch 17 in the manner described above, except instead of entering an amount in response to the blinking display prompt, the user simply presses the future value switch 17 again. Pressing the future value switch 17 a second time without entering an amount causes the next account display in turn to blink. The user can thus use the future value switch 17 to scroll through the accounts until the desired account is reached at which time the user enters the amount to invest in response to the blinking display. The future value of that account is then calculated and displayed as described in detail above.

The specific microprocessor selected as well as the specific type of displays and number of segments used for LCD or LED displays and their equivalents are variable as known by one of ordinary skill in the art, and such variations are thus considered within the scope of this invention. In addition, the flexibility of the microprocessor permits the present invention to include added capabilities such as keeping track of the total amount saved in each budgetary savings account or other capabilities.

Included with the present invention is an investment booklet 36, as shown in FIG. 2, that instructs the user in actual investments that correspond to the budgetary savings accounts. For example, for funds in the retirement account 8, booklet 36 would advise the user on investments suitable for retirement funds that have a goal of earning at least about 10% of interest for a term of 65 years minus the age of the user. Likewise the booklet would advise the user for funds in the home 9 account for earning at least about 8% for a term of 30 years minus the age of the user, and for funds in the college account for earning at least about 7% for 18 years minus the age of the user.

The investment booklet 36 can be compiled by utilizing current investment advice from those skilled in the financial planning arts, and can be updated periodically to maintain currency with the marketplace. In accord, the interest rates utilized in the invention that correspond to those in the investment booklet are conservatively selected and can be adjusted to remain current.

Periodically, and/or at certain levels of savings, the investment booklet 36 can advise the user to invest the saved funds in suitable investments.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An educational savings apparatus comprising:
   a housing including a plurality of separate hollow compartments, each of said plurality of separate hollow compartments corresponding to one each of a plurality of preselected budgetary savings accounts, each of said plurality of separate hollow compartments including means for inserting money therein, said housing further including:
   means for entering an amount to invest;
   means for electronically calculating a preselected percentage of said amount to invest for each of said preselected budgetary savings accounts that correspond to each of said separate hollow compartments;
   means for displaying said preselected percentage of said amount to invest for each of said preselected budgetary savings accounts that correspond to each of said separate hollow compartments.

2. The educational savings apparatus of claim 1 further comprising means for electronically calculating a future value of said preselected percentage of said amount to invest for each of said preselected budgetary savings accounts that correspond to each of said separate hollow compartments using a preselected interest rate percentage and a preselected term for each of said preselected budgetary savings accounts; and
   means for displaying said future value of said preselected percentage of said amount to invest for each of said preselected budgetary savings accounts.

3. The educational savings apparatus of claim 2 further comprising:
   means for entering an age of a user; wherein the calculation of said future value takes into consideration the age entered by said user.

4. The educational savings apparatus of claim 1 further comprising:
   means for selecting future value calculations including:
   means for electronically calculating a future value of said entered amount to invest for each of said preselected budgetary savings accounts that correspond to each of said separate hollow compartments using a preselected interest rate percentage and a preselected term for each of said preselected budgetary savings accounts;
   means for displaying said future value of said amount to invest for each of said preselected budgetary savings accounts.

5. The educational savings apparatus of claim 4 further comprising:

an investment booklet to advise the user on investments corresponding to each of said preselected budgetary savings accounts.

6. The educational savings apparatus of claim 5 wherein there are three budgetary savings accounts that correspond to three separate hollow compartments, said budgetary savings accounts comprising retirement, home, and college accounts.

7. The educational savings apparatus of claim 6 wherein said preselected percentage of said amount to invest is ten percent (10%).

8. The educational savings apparatus of claim 7 wherein:

said preselected interest rate for future value calculations for said retirement savings account is ten percent (10%), for said home savings account is eight percent (8%), for said college savings account is seven percent (7%);

said preselected term for future value calculations for said retirement savings account is 65 years minus an age of a user, for said home savings account is 30 years minus said age, for said college savings account is 18 years minus said age.

9. The educational savings apparatus of claim 8 wherein said three hollow compartments comprise three hollow representative figures corresponding to said retirement savings account, said home savings account, and said college retirement account.

10. The educational savings apparatus of claim 9 further including a fourth spending money budgetary savings account and a corresponding fourth hollow representative figure.

11. The educational savings apparatus of claim 10 wherein said representative figures include a boat, a home, a graduate, and a piggy bank.

12. The educational savings apparatus of claim 11 further including means for removal of money inserted within said separate hollow compartments.

13. The educational savings apparatus of claim 12 wherein said means for electronically calculating includes a microprocessor and a computer program housed within said housing.

14. A method of savings investment education comprising the steps of:

selecting a plurality of budgetary savings accounts;

entering an amount to invest;

selecting a percentage of said amount to invest for savings;

calculating said selected percentage of said amount to invest for each of said plurality of budgetary savings accounts; and displaying said calculated selected percentage of said amount to invest for each of said plurality of selected budgetary savings accounts.

15. The method of savings investment education of claim 14 further comprising the steps of:

selecting an interest rate and a term for each of said plurality of selected budgetary savings accounts;

calculating a future value of said calculated selected percentage of said amount to invest for each of said plurality of selected budgetary savings accounts using said selected interest rate and said selected term for each of said selected budgetary savings accounts; and displaying said calculated future valves.

16. The method of savings investment education of claim 15 further comprising the steps of:

entering an age of a user prior to calculating the future value; wherein said future value calculation takes into consideration the entered age.

17. The method of savings investment education of claim 16 further comprising the step of storing an amount of money equal to said calculated selected percentage of said amount to invest for each of said plurality of selected budgetary savings accounts in a plurality of hollow storage containers.

18. The method of savings investment education of claim 16 further comprising the steps of:

selecting future value calculations;

calculating a future value of said amount to invest for each of said plurality of selected budgetary savings accounts using said selected interest rate and said selected term for each of said selected budgetary savings accounts;

displaying said calculated future valves.

19. The method of savings investment education of claim 18 further comprising the step of providing an investment instruction booklet to advise the user on investments for each of said plurality of selected budgetary savings accounts.

20. An educational savings apparatus comprising:

a housing including a base portion and a plurality of separate hollow compartments, each of said plurality of separate hollow compartments corresponding to one each of a plurality of preselected budgetary savings accounts, each of said plurality of separate hollow compartments including means for inserting money therein, said plurality of separate hollow compartments totals four, one each corresponding to one each of three budgetary savings accounts comprising a retirement savings account, a home savings account, a college savings account, and a fourth separate hollow container corresponding to a spending account, said housing further including:

a keypad mounted on said base portion for entering an age of a user and an amount to invest;

a first display mounted on said base portion for displaying said age;

a second display mounted on said base portion for displaying said amount to invest;

a microprocessor housed within said base portion for calculating 10% of said amount to invest for each of said three budgetary savings accounts;

a third, a fourth, and a fifth display mounted on said base portion for displaying said 10% of said amount to invest for each of said retirement, said home, and said college accounts, respectively;

said microprocessor further calculating a future value of said 10% of said amount to invest for each of said three budgetary savings accounts using a 10% interest rate and a term of 65 years minus said age for said retirement account, using an 8% interest rate and a term of 30 years minus said age for said home account, and using a 7% interest rate and a term of 18 years minus said age for said college account;

a sixth, a seventh, and an eighth displays mounted on said base portion for displaying said three future values of said 10% of said amount to invest for each of said retirement, said home, and said college accounts, respectively;

a switch mounted on said base portion for selecting future value calculations including:

said microprocessor calculating a future value of said entered amount to invest for each of said retirement, said home, and said college budgetary savings accounts using a 10% interest rate and a term of 65 years minus said age for said retirement account, using an 8% interest rate and a term of 30 years minus said age for said home account, and using a 7% interest rate and a term of 18 years minus said age for said college account;

said sixth, said seventh, and said eighth displays displaying said three future values of said amount to invest for each of said retirement, said home, and said college accounts, respectively;

an investment booklet removably connected to said base portion to advise the user on investments corresponding to each of said retirement, said home, and said college savings accounts;

each of said four separate hollow compartments corresponding to said retirement account, said home account, said college account, and said spending account comprise hollow representative figures.

21. The educational savings apparatus of claim 20 wherein said representative figures are a boat, a home, a graduate, and a piggy bank, corresponding to said retirement account, said home account, said college account, and said spending account, respectively, and further including means for removal of money inserted therein.

* * * * *